(12) United States Patent
Gilligan et al.

(10) Patent No.: US 10,606,823 B2
(45) Date of Patent: *Mar. 31, 2020

(54) METHOD AND SYSTEMS FOR MONITORING CHANGES FOR A SERVER SYSTEM

(71) Applicant: MASTERCARD INTERNATIONAL INCORPORATED, Purchase, NY (US)

(72) Inventors: Robert Gilligan, Dublin (IE); Glen Bollard, Dublin (IE); Grace Sutton, Wicklow (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 112 days.

This patent is subject to a terminal disclaimer.

(21) Appl. No.: 15/618,040

(22) Filed: Jun. 8, 2017

(65) Prior Publication Data

US 2017/0357685 A1 Dec. 14, 2017

(30) Foreign Application Priority Data

Jun. 9, 2016 (EP) .................................... 16173813

(51) Int. Cl.
*G06F 16/23* (2019.01)
*G06F 16/27* (2019.01)
*G06F 16/21* (2019.01)

(52) U.S. Cl.
CPC ........ *G06F 16/2358* (2019.01); *G06F 16/219* (2019.01); *G06F 16/27* (2019.01)

(58) Field of Classification Search
None
See application file for complete search history.

(56) References Cited

U.S. PATENT DOCUMENTS

| | | |
|---|---|---|
| 7,203,881 B1 | 4/2007 | Williams et al. |
| 7,676,510 B1 | 3/2010 | Karinta |
| 7,818,299 B1 * | 10/2010 | Federwisch ......... G06F 11/2066 707/649 |
| 8,370,303 B1 * | 2/2013 | Ceschim ............... G06F 16/219 707/640 |
| 9,524,389 B1 * | 12/2016 | Roth ..................... G06F 21/554 |
| 9,792,371 B1 * | 10/2017 | Mengle ............... G06F 16/9535 |
| 2003/0005109 A1 | 1/2003 | Kambhammettu et al. |
| 2003/0051188 A1 | 3/2003 | Patil |
| 2005/0086246 A1 | 4/2005 | Wood et al. |

(Continued)

*Primary Examiner* — Richard L Bowen
(74) *Attorney, Agent, or Firm* — Harness, Dickey & Pierce, P.L.C.

(57) ABSTRACT

A method and systems for monitoring changes for a server system are disclosed. All data contents, for a first time point, of a dataset of the server system are obtained, and all data contents for a second time point of the dataset are also obtained. The first time point contents of the dataset are compared with the second time point contents of the dataset. The comparison is then used to determine a change for the server system between the first and second time points. The first time point contents of the dataset may be stored and, following the steps of comparing and using the comparison, a record of the change determined may be stored, and the stored first time point contents of the dataset discarded.

8 Claims, 5 Drawing Sheets

(56) References Cited

U.S. PATENT DOCUMENTS

| | | | |
|---|---|---|---|
| 2005/0132346 A1* | 6/2005 | Tsantilis | G06F 8/71 |
| | | | 717/168 |
| 2008/0114718 A1 | 5/2008 | Anderson et al. | |
| 2014/0149354 A1* | 5/2014 | Chan | G06F 9/455 |
| | | | 707/639 |
| 2015/0081994 A1* | 3/2015 | Christopher | G06F 11/1458 |
| | | | 711/162 |
| 2015/0149411 A1 | 5/2015 | Plisko et al. | |
| 2015/0244599 A1* | 8/2015 | Nagai | G06F 11/0727 |
| | | | 709/223 |
| 2015/0347286 A1* | 12/2015 | Kruglick | H04L 43/50 |
| | | | 714/38.1 |
| 2016/0266924 A1* | 9/2016 | Iyobe | G06F 9/45558 |
| 2016/0306627 A1* | 10/2016 | Hewitt | G06F 8/33 |
| 2016/0364279 A1* | 12/2016 | Brew | G06F 11/079 |
| 2017/0103223 A1* | 4/2017 | Deulgaonkar | G06F 9/544 |
| 2017/0155549 A1* | 6/2017 | Bouz | H04L 41/147 |

\* cited by examiner

METHOD AND SYSTEMS FOR MONITORING CHANGES FOR A SERVER SYSTEM

CROSS-REFERENCE TO RELATED APPLICATION

This application claims the benefit of and priority to European Patent Application No. 16173813.3, filed Jun. 9, 2016. The entire disclosure of the above application is incorporated herein by reference.

FIELD

This disclosure is directed to methods and systems for monitoring changes for a server system, such as a database server system.

BACKGROUND

This section provides background information related to the present disclosure which is not necessarily prior art.

Generic database systems and server systems are well known to the art. Generally, such systems include at least one server machine hosting database information or data, and usually a server or database management system.

Such systems are often dynamic, in that the data held by the server, the database or the database management system are regularly updated with new information or data, or with rearrangement, reformatting, removal or the like of existing information. Such systems are also subject to possible errors or inconsistencies in the data held.

Certain basic monitoring systems for server systems are known. Such systems are typically passive, in that they are usually only active when a problem occurs in the database, which triggers the monitoring system. Previously considered systems are usually also simplistic, in that they only monitor the database for certain types of problems or changes. Such systems may also only monitor items which have been flagged as changes to the system. Changes to the system which have not been flagged, but nevertheless been made, may therefore be overlooked. Previous systems may also only look for specific changes, specific types of changes, or in specific locations for changes. Thus alterations or modifications in areas not specified or monitored may also be missed. The fact that these systems may search for changes specifically may also be a disadvantage.

Backup devices for such systems are also known, however these are typically merely for redundancy of the data on the system, rather than for any monitoring or analysis of it.

The present disclosure aims to address these problems and provide improvements upon the known devices and methods.

SUMMARY

This section provides a general summary of the disclosure, and is not a comprehensive disclosure of its full scope or all of its features. Aspects and embodiments of the disclosure are set out in the accompanying claims.

In general terms, one embodiment of a first aspect of the disclosure can provide a method of monitoring changes for a server system, comprising: obtaining all data contents, for a first time point, of a dataset of the server system; obtaining all data contents, for a second time point, of the dataset of the server system; comparing the first time point contents of the dataset with the second time point contents of the dataset; and using the comparison to determine a change for the server system between the first and second time points.

This allows a comprehensive method for determining changes in a dataset of a server system; as the entire, total or complete contents of the dataset are obtained, no change in that dataset should be missed, for example by looking only for certain types of change. The comparison with the contents at the second time point provides the means for finding the change between the two full contents snapshots of the dataset. This method also concentrates first on collecting all the data first, and then on what the change might be, in contrast to previous methods which attempt to search for a change before obtaining data relating to such a change.

The server system may be a database server system, such as those known to the art. The change determined, for the server system, may be any alteration, modification, variance, discrepancy, difference, divergence or the like in the data, or relating to the data of the server system. For example, a change in a data object, such as a table of the database, may be found in the processing or analysis of the data.

The comparison of all contents of the dataset at the respective time points means that all possible comparisons between data in those datasets are available. As the dataset is the same dataset, at different time points, the content may differ between the time points (i.e. there may be a first version and a second version), and hence a change can be determined. However, the dataset itself can be the same dataset, whether or not it has been modified in the meantime.

Preferably, the method comprises storing the first time point contents of the dataset; and following the steps of comparing and using the comparison, storing a record of the change determined. More preferably, the method comprises, following the step of storing the record of the change determined, discarding the stored first time point contents of the dataset.

This allows for only the change determined to be stored, and for redundant data (such as old previous dataset contents) to be deleted. This therefore allows for consolidation, de-cluttering of the monitoring storage, and potentially frees up that resource for other uses in the second hardware system. The method of this embodiment can therefore at any given time, store one or more recorded changes (determined by comparison between subsequent data), alongside the present data ready for comparison with the next data received.

Suitably, the method comprises storing the second time point contents of the dataset; obtaining all data contents, for a third time point, of the dataset of the server system; comparing the second time point contents of the dataset with the third time point contents of the dataset; using the comparison to determine a change for the server system between the second and third time points; storing a record of the change determined; and discarding the stored second time point contents of the dataset.

In an embodiment, the step of comparing comprises determining a difference between the respective time point contents of the dataset, and the step of using the comparison comprises noting the determined difference as the change for the server system between the respective time points.

In another embodiment, the steps of obtaining all data contents comprise duplicating all data contents, for the respective time point, of the dataset of the server system.

Preferably, the server system is operated on a first hardware system, and the method comprises: transferring the data duplicated from the server system from the first hardware system to a second hardware system separate from the first hardware system; and processing the duplicated data on the second hardware system to determine a change for the server system between the respective time points.

This removal of the monitoring process to a separate system allows the monitoring of the server system to be carried out away from the system itself, so that the system is not disturbed or interfered with during the monitoring process. This also means that local resources are not being used for the monitoring process. The duplication of the data for removal means that much more detailed analysis can be carried out on the data, as the data is no longer housed by the server and can therefore be more freely examined and interfered with. This can also allow more intensive and more frequent analysis of the data, and allows the possibility of far more active and "always-on" analysis, as the local data is not disturbed.

Suitably, the method comprises, following determining the change for the server system between the respective time points, generating an alert reporting said change.

In embodiments, the method comprises: storing a record of the determined change; comparing the determined change to a stored record of a previously determined change for the server system; and using the comparison to evaluate the current change for the server system.

This allows for prioritisation and categorisation of changes determined, and also for monitoring of the historical progression of changes of given types or locations.

In embodiments, the server system is a database system, and comprises: a database; and a database management system. The database and/or management system may comprise a database schema, a database administrator or the like.

Suitably, the data duplicated from the server system comprises data relating to one or more of: data objects; schema; size; status; access history; synchronisation; replication; operating system; and management parameters of a database of the server system. In embodiments, the step of using the comparison to determine a change may comprise comparing data relating to one or more of these.

For example, the data may relate to a change in status of the system, from a normal running mode to an error mode. The processing may therefore determine the change between these modes from the data compared. In another example, the processing may find a change in a data object, such as an edited object in a relational table database.

One embodiment of a second aspect of the disclosure can provide a method of detecting changes for a server system comprising: obtaining contents for a first time point of a dataset of the server system; obtaining contents for a second time point of the dataset of the server system; and comparing the contents for the first time point with the contents for the second time point, to determine a change in the server system between the first and second time points.

One embodiment of a third aspect of the disclosure can provide a system for monitoring changes for a server system, comprising a processor configured to carry out the above.

One embodiment of a fourth aspect of the disclosure can provide a system for monitoring changes for a server system, comprising: a first hardware system on which the server system is operated; a second hardware system separate from the first hardware system, comprising at least one processor; and a transmission device configured to transfer data from the server system from the first hardware system on which the server system is operated, to the second hardware system, wherein the processor of the second hardware system is configured to: obtain all data contents, for a first time point, of a dataset of the server system; obtain all data contents, for a second time point, of the dataset of the server system; compare the first time point contents of the dataset with the second time point contents of the dataset; and use the comparison to determine a change for the server system between the first and second time points.

The second hardware system may comprise a monitoring server system, and the first hardware system may comprise a server, such as a database server. The (database) servers may therefore be the clients of the monitoring server system, and the (database) servers may serve data source clients, providing database services for those clients. The hardware systems may be single or distributed systems, or components of such systems.

Further aspects of the disclosure comprise computer program applications, or computer readable media comprising computer program code, adapted, when loaded into or run on a computer or processor, to cause the computer or processor to carry out a method according to any of the aspects and embodiments described above.

The above aspects and embodiments may be combined to provide further aspects and embodiments of the disclosure.

Processors and/or controllers may comprise one or more computational processors, and/or control elements having one or more electronic processors. Uses of the term "processor" or "controller" herein should therefore be considered to refer either to a single processor, controller or control element, or to pluralities of the same; which pluralities may operate in concert to provide the functions described. Furthermore, individual and/or separate functions of the processor(s) or controller(s) may be hosted by or undertaken in different control units, processors or controllers.

To configure a processor or controller, a suitable set of instructions may be provided which, when executed, cause said control unit or computational device to implement the techniques specified herein. The set of instructions may suitably be embedded in said one or more electronic processors. Alternatively, the set of instructions may be provided as software to be executed on said computational device.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The disclosure will now be described by way of example with reference to the accompanying drawings, in which.

Corresponding reference numerals indicate corresponding parts throughout the several views of the drawings.

DETAILED DESCRIPTION

Figure 1:
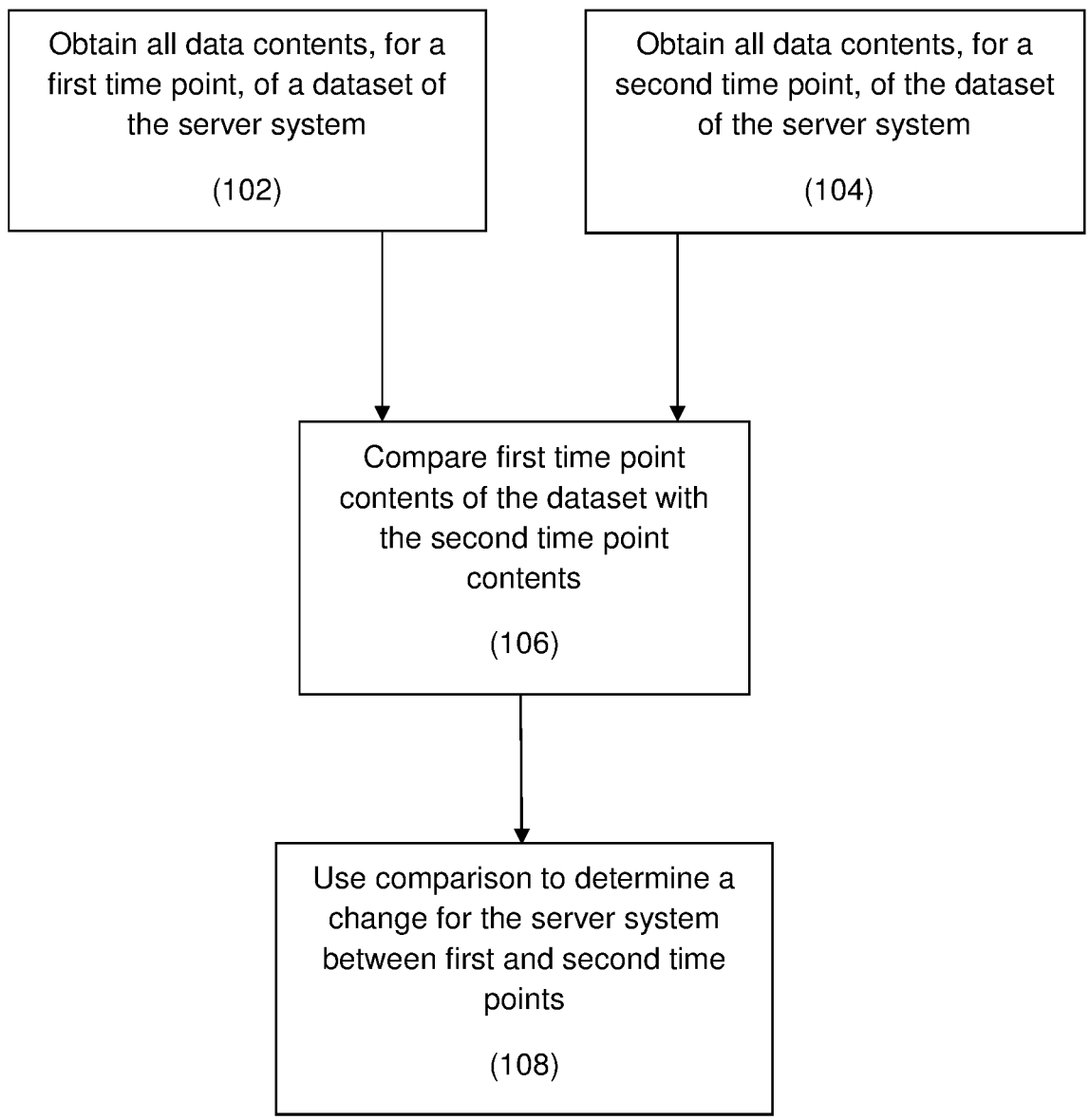
FIG. 1 is a diagram illustrating steps of a method according to an embodiment of the disclosure.

Embodiments of the present disclosure will be described, by way of example only, with reference to the drawings. The description and specific examples included herein are intended for purposes of illustration only and are not intended to limit the scope of the present disclosure.

Embodiments of the disclosure provide systems and methods for monitoring changes to a server or database, by taking the entire contents of a dataset from the server/database, and later taking the entire contents again, and comparing the two versions. This is in contrast to previous schemes, which attempt to find changes or errors in certain locations or in certain specific ways, or check changes already marked. Features of this kind allow advantages of the disclosure such as providing a comprehensive or fail-safe monitoring system, whether or not a specific type or location of change is being sought.

Embodiments of the disclosure might be considered "dumb" or simplistic compared to previous methods having highly complex methods of change or error detection. They can be considered somewhat counter-intuitive in this way, and furthermore in that copies of entire datasets are made, which would previously have been considered highly inefficient for finding changes or errors which would typically be miniscule in comparison.

In addition, by moving all processing of the data (comparisons/identifying differences) away from the monitored database/server and onto a centralised hub, systems of embodiments of the disclosure can better afford to run these scans on full data sets, which previously considered tools may have been considered inefficient or performance impacting.

Methods and systems of the disclosure can also be contrasted with mere backup systems—these simply copy versions of a data source, or more usually, store copies of any new data since the last backup. There is no attempt in such schemes to determine any changes in the data. In fact, an embodiment of the disclosure can provide a simple means of error-checking a backup system. Take a system in which backup copy A has been made of a dataset X, and information time-stamped as post-dating that initial backup has been stored in backups B and C. An embodiment of the disclosure can compare the contents of X at the time points for A, B and C, and check that the contents of B and C properly reflect the changes which existed at those time points.

Embodiments of the disclosure are applicable to databases and database systems, but also to server systems which may not necessarily be designated as database servers, but nevertheless store data, the management of which may require monitoring.

Embodiments of the disclosure are server/database (DB) monitoring tools which will, for example, alert a user or other system when changes are made to a database, for instance to a schema within an object-relational database or database management system. The tools can accommodate the necessity for change control and schema change integrity within database administration.

Figure 2:
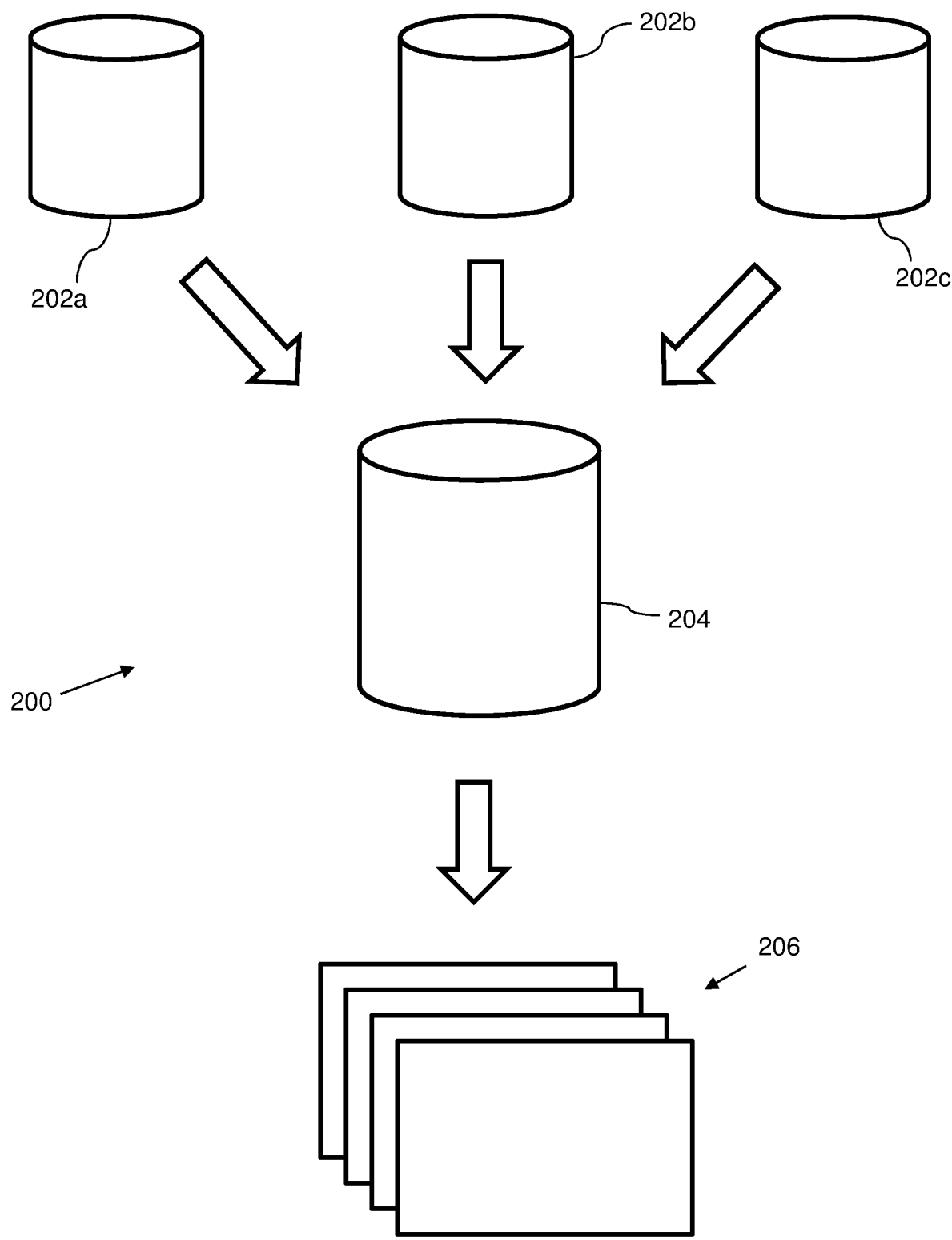
FIG. 2 is a schematic diagram illustrating a monitoring system according to an embodiment of the disclosure.

The monitoring tool itself can reside within the hub monitoring system (such as that shown in FIG. 2 (204)), and all functionality (comparing, storing results, etc.) can happen within the hub. There may also be provided a GUI frontend dashboard to view the reports/alerts/tool administration and configuration, along with email based alerting.

The tool can monitor/alert on any structured IT infrastructure system, such as a database management system, or OS server (Linux, windows, MAC OS, etc.). Data being collected is regarding the current state of the structure within the monitored infrastructure, a "snapshot" of a given point in time. The tool itself can be designated a database- or server-centric comparison engine, which pulls data from various structured IT infrastructure.

Embodiments of the disclosure can provide a monitoring application which is 'always on'. In embodiments, the system can be self maintained, for example:
in terms of growth (the application can delete redundant data and utilise reclaimed space to reduce costs of running the application);
in terms of monitoring/alerting (checks can be scheduled and alerts automated, which removes the need for manual efforts to maintain the application).

Embodiments of the disclosure promote proactive monitoring rather than passive monitoring; since potentially the entire database/dataset is duplicated regularly and monitored for changes, all possible changes should be noted. This information can therefore be used to better control the monitoring process.

One previously considered monitoring system may monitor a change in the current status of a process of a pre-defined rule, for example, the status of a database changing from open to closed, which may prompt an alert. Embodiments of the disclosure in contrast provide comparison of changes which can allow different types of monitoring analysis to be performed, such as tracking the progress of changes to a database, or monitoring the frequency of changes. The systems of embodiments are therefore aware of how an environment has looked/changed in the past, and can alert on changes that previously considered monitoring tools would not have considered an event.

Embodiments of the disclosure can provide the following benefits:
Reduce risk of database administration (DBA) errors and/or issues caused by erroneous schema changes;
Identify invalid DB objects and when objects became invalid;
Provide historical reports on all changes;
Provide database capacity planning via database space usage reports;
Ensure DBA standards are being adhered to in all environments;
Ensure security and compliance standards are being adhered to in all environments.

Another feature provided by embodiments of the disclosure is the ability to ensure all environments of a system are identical or meet requirements. For example, the tool can monitor/alert if a production environment is not identical to pre-production/lower environments.

In addition, in embodiments, the more these systems are used, the more efficient they become. Rules and comparisons can be based on collected data so the more data that is available, the more accurate the results will be. Each tool in the suite can also utilise data collected from other tools. Using the application as an entire suite increases the accuracy, performance and intelligence of the individual tools.

FIG. 1 is a diagram illustrating steps of a method according to an embodiment of the disclosure. First, all data contents for a first time point of a dataset of the server system are obtained 102. Data contents for a second time point of the same dataset are also obtained 104. The first time point contents are compared 106 with the second time point contents, and the result of the comparison is used to determine a change for the system between the first and second time points. For example, this may be a simple change in the dataset itself. In a counter example, it is possible that the result of the comparison will give a null result, which can be used to determine that the system has changed; for example, it may be expected that the dataset is constantly updating and being modified, and if the comparison 106 yields no result, this comparison can be used to flag a change in the system, i.e. that the server data or database has not been updated or modified during those time points.

The data housed in the data area or database can be any type of data suitable for a database or monitorable dataset. The data addressed by the monitoring system (i.e. that duplicated from the system) can be any data from the server or database itself, or from the database management system. For example, the data may be data objects in or from the database itself; a data item in the database may be altered. It may be data from or relating to the database schema, such as parameters governing the structure or functionality of the database; for example, an integrity constraint may be changed. It may be the size of the database or data area of the server; a number of objects, size of a matrix or table of values may have been altered, for example by adding a column to a table. It may be a status of the server or database; for example, toggle data noting that the database is running, or down; data noting that given software is installed/running. It may relate to access history; data logs showing which users have accessed the server or database will change with new access instances. It may relate to synchronisation or replication of the database; data denoting when or whether these have occurred recently, or indicating degrees of success. It may relate to the operating system in use. The data may also be or relate to management parameters of the database management system; for example, records of events, actions taken during management, or changes in management systems.

The dataset of the server/database which is obtained or duplicated in each step may include all data from the entire database or data area, in all data categories. Alternatively, it may only include all data from a subset of the database, for example for one of the categories noted above. Where the database is distributed, for example across multiple hardware systems, the (entire/complete) dataset obtained may include data from more than one individual storage means on a respective such hardware system.

The processing for determining the change will be described in more detail below with reference to FIG. 5.

In an embodiment, all tools in the monitoring suite identify changes/differences using a 'scan' approach. A scan takes a snapshot of an environment at a given time. Comparing the current scan with the last scan can identify any differences in that time period.

In embodiments, the comparison engine may take the following steps:
 i. during a 'scan' of a monitored system or infrastructure, data is pulled into a centralized hub by various techniques, depending on what type of infrastructure is being monitored;
 ii. the data is then stored in database tables within the hub. The data is labelled with a unique identifier and is also assigned metadata such as a timestamp, a scan run number, a name/description of monitored infrastructure;
 iii. on the next scan, the same procedure is followed. Data is pulled, stored and labelled with an identifier and metadata;
 iv. the comparison tool initiates and looks for differences between the two scan datasets;
 v. results of the scan are then stored in result tables;
 vi. result data is also assigned metadata, including:
  date;
   was there actually any difference at all (which will determine if alerts are sent or not sent);
   the severity of the difference—based on pre-defined thresholds of severity, the amount of difference(s) will determine the type/priority of alert sent;
 vii. result data can now be used for:
  alerting on changes in a system or infrastructure;
  reporting on changes within a period of time, building a timeline of changes;
  identifying trends/patterns within an infrastructure based on the changes happening over a time period;
  future planning of infrastructure based on reporting data;
  redesigning/improving infrastructure.

For example, with an embodiment in which a database schema is being monitored:
 Day 1: a scan is run which captures a snapshot of a specific schema
 Day 2: changes are made to a table in the schema
 Day 2: a scan is run which captures a new snapshot of the schema. Comparison is made between Scan1 and Scan2 and the table change is identified and alerted as a change.

In embodiments, the system can work on a 'hub and spoke' model. The application monitoring the system runs on a centralised hub and monitors multiple client server or DB environments by pulling the relevant data from each client into the hub and running comparisons on the hub.

FIG. 2 is a schematic diagram illustrating a monitoring system according to an embodiment of the disclosure. The monitoring system 200 is comprised of the plurality of server systems 202a, 202b, 202c and the single monitoring system 204. Data can be drawn from the servers by the central monitoring system, as indicated by the arrows. The processing is then carried out on the monitoring system. The monitoring system, having determined changes in the servers can output reports or alerts 206 based on the determined changes. For example, a report could list the historical changes for a given database, for a certain dataset. An alert could be sent to a user or another system, when a change detected is particularly significant, such as a large change to a dataset/database, or a change in a database which is not frequently accessed.

Figure 3:
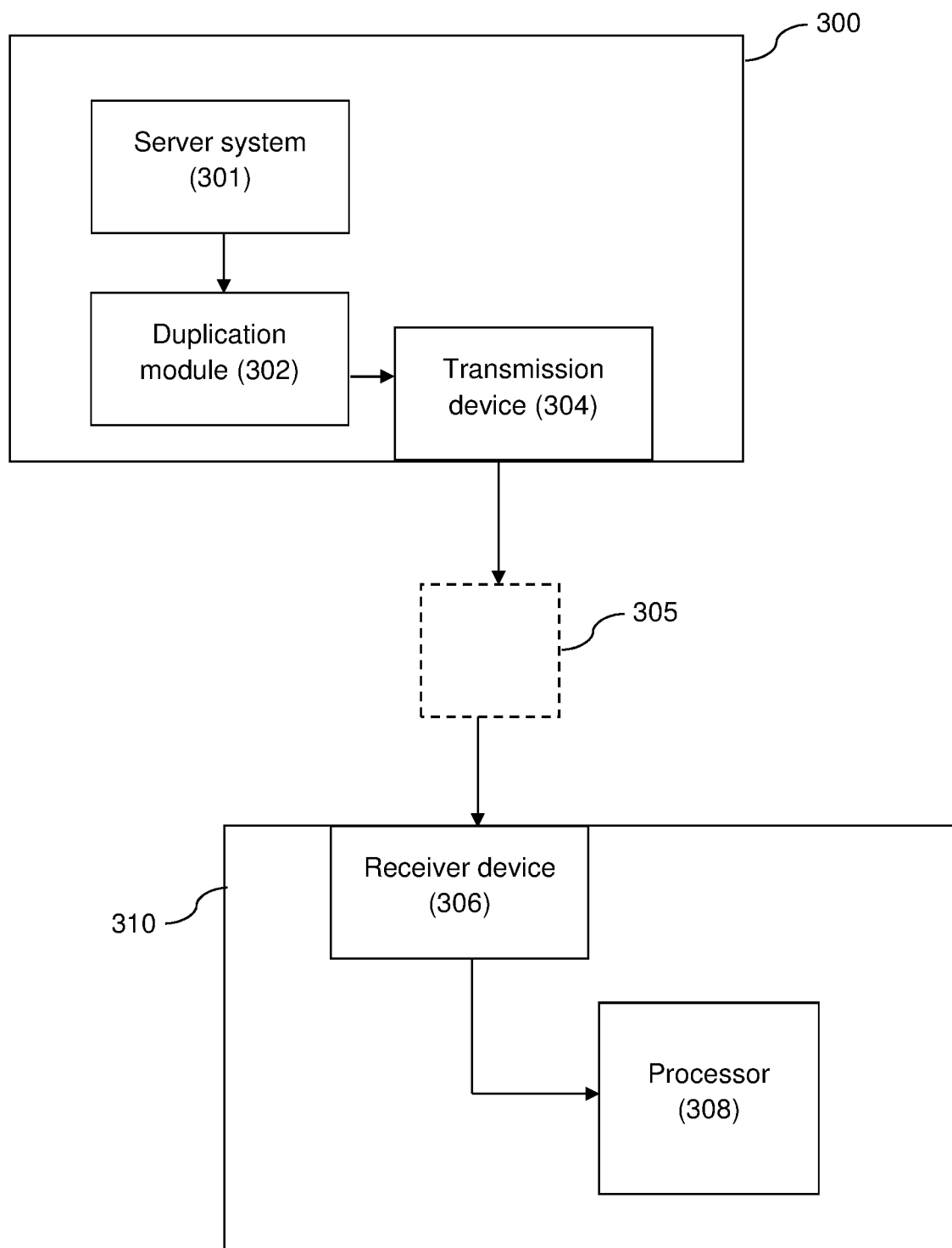
FIG. 3 is a diagram illustrating components of a monitoring system according to an embodiment of the disclosure.

FIG. 3 is a diagram illustrating components of a monitoring system according to an embodiment of the disclosure. The first hardware system 300 houses the server system 301, a duplication module 302 and a transmission device 304. Data can be pulled from the system and duplicated by the duplication module, and then transferred elsewhere by the transmission device. The medium by which the transfer takes place is indicated at box 305; this may be a network, which communications devices on the first and second hardware systems communicate with. It may simply be that the two systems are directly connected.

The second hardware system 310 houses a receiver device 306 and a processor 308. The receiver receives the transferred duplicated data from the first hardware system, and passes it to the processor. The processor undertakes tasks such as processing the data to determine changes.

The first hardware system may be any such system capable of storing a database. The transfer of the data duplicated from the system, to the second hardware system can be implemented depending on the nature of the separation of the first and second hardware systems. These may simply be physically separated, though connected by wiring or a bus, for example in a simple system containing two hardware subsystems. The transfer can then simply be made along the bus. In a client-server type system, where the monitoring system is a server for the database clients, the transfer may be over a network.

Figure 4:
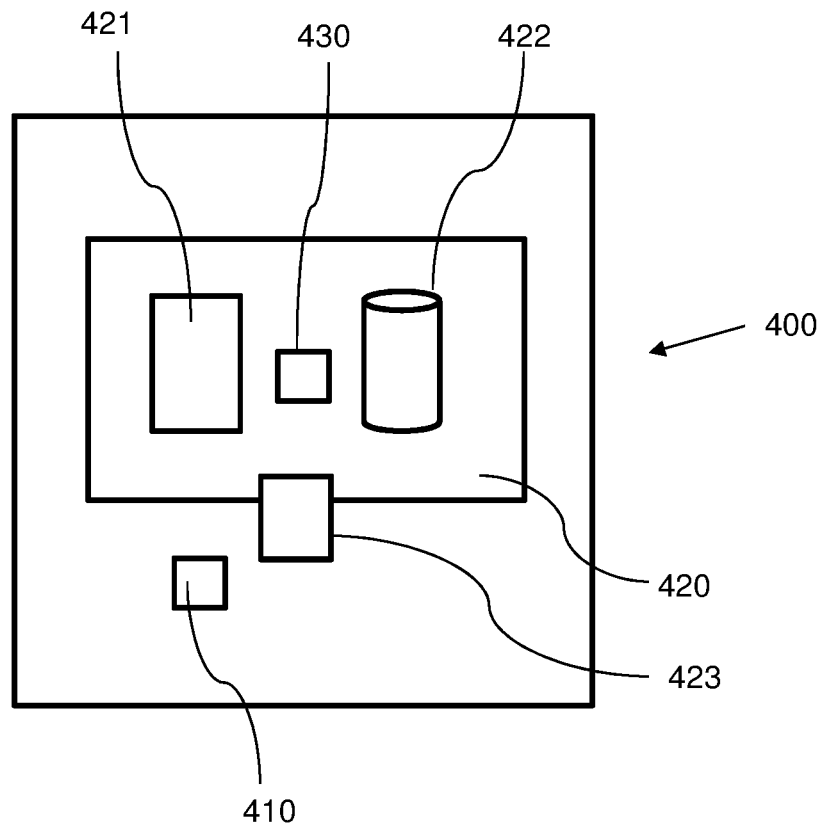
FIG. 4 is a diagram illustrating components of a server system according to an embodiment of the disclosure.

FIG. 4 is a diagram illustrating the components, structure and functionality of a server system 400 according to an embodiment of the disclosure, which can provide the features of the monitoring server 204 shown in FIG. 2, for example processing the data to determine changes in the monitored system(s). Note that a server such as this could also provide the functionality for a server system such as those shown in FIG. 2 (server systems 202a, 202b, 202c).

The server comprises a processing environment 420 with processor 421 and memory 422, with associated communications functionality 423. The communications functionality may include a networking capability allowing communication with a network, or directly with another server or computer device, such as a monitoring server 204 or a server or database system 202a, 202b, 202c. This communication may be secured. The memory 422 may store readable instructions to instruct the processor to perform the functions of the monitoring system. The processor 421 is a representation of processing capability and may in practice be provided by several processors. A database 410 is provided, storing data as applicable. For the monitoring server 204, this database can provide the storage for previous data transferred from the databases, for records of previous changes, and the like. Elements shown within the processing environment 420 use the processor 421 and the memory 422 to deliver functionality; for example, these elements can provide steps of embodiments of the disclosure such as comparing the contents of the dataset, and using the comparison to determine a change. A database management system 430 module can be located within the processing environment 420, to provide the management functions for a database. The database management system may also comprise functions of other parts of the server, such as the processor 421, the memory 422 and the database 410 itself.

The computing devices noted above with reference to FIGS. 3 and 4 may include one or more of logic arrays, memories, analogue circuits, digital circuits, software, firmware and processors. The hardware and firmware components of the computing devices may include various specialized units, circuits, software and interfaces for providing the functionality and features described herein. The processor(s) may be or include one or more microprocessors, application specific integrated circuits (ASICs), programmable logic devices (PLDs) and programmable logic arrays (PLAs).

Figure 5:
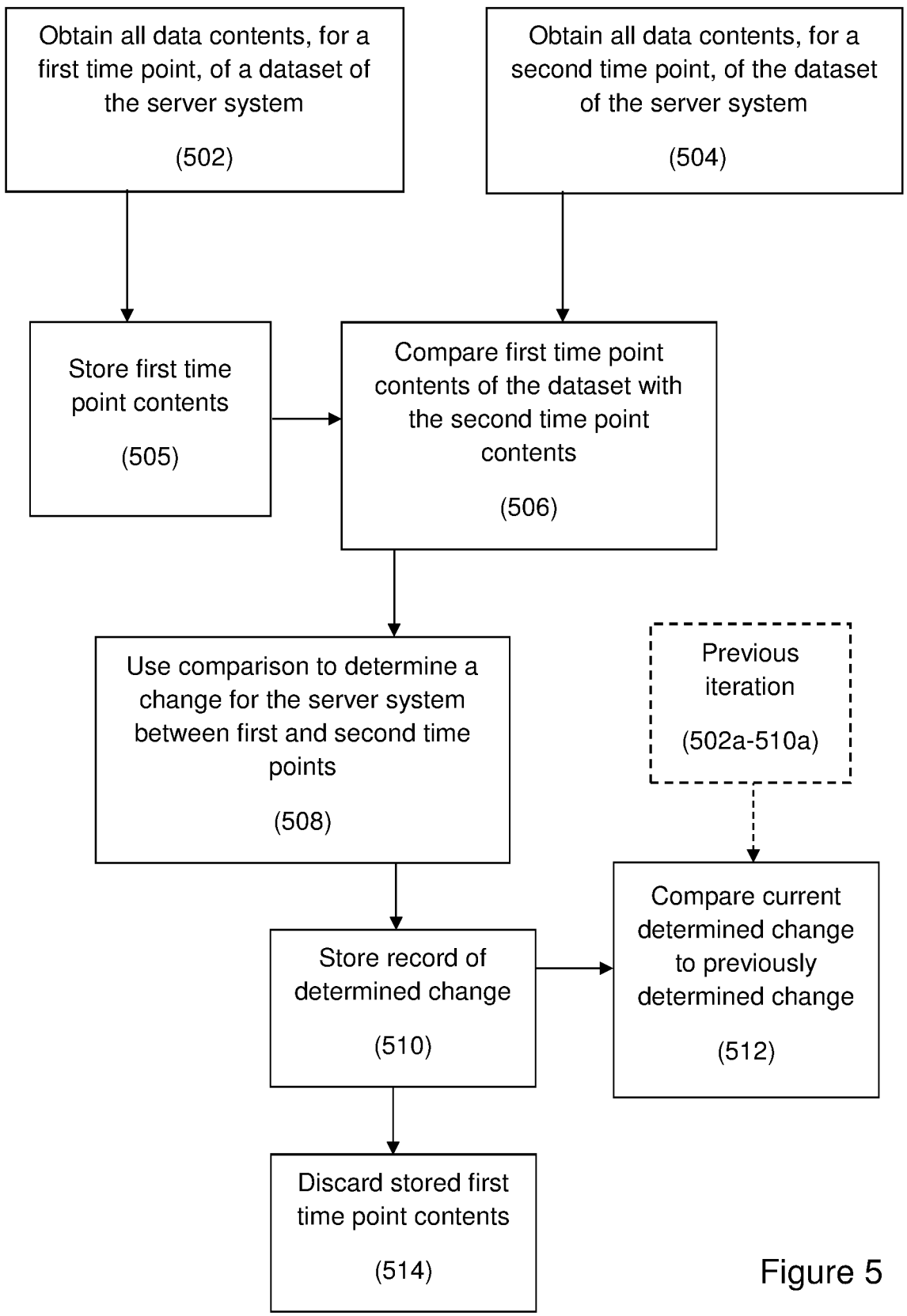
FIG. 5 is a diagram illustrating steps of a method according to an embodiment of the disclosure.

FIG. 5 is a diagram illustrating steps of a method according to an embodiment of the disclosure.

In a typical monitoring scheme using embodiments of the disclosure, duplicated data from the system is continually being transferred, for example at scheduled times, to the separate hardware system so that the data and the subsequent additions and updates to that data can be processed to find changes to the server/database.

In the embodiment shown in FIG. 5, as in FIG. 1, the entire data contents of the dataset at the first 502 and second 504 time points have been obtained. Usually these will have been duplicated from the database and transferred to the hub, as in FIG. 3.

The first time point contents are then stored 505. As the process is carried out in a later iteration, the two time points will of course be second and third time points, and so on. A later iteration carries out the same steps, denoted in FIG. 5 as steps 502a to 510a.

The stored first time point contents are then compared with the second time point contents 506 as in FIG. 1, and then the comparison is used to determine any change (at 508). This comparison may be done by any simple technique, including previously considered comparison techniques. This is in part because the method itself is essentially simple at this stage; rather than a complex technique to isolate changes from a large dataset, the method copies the entire dataset in two versions, and simply compares the versions. The comparison may simply compare each datum in the set with the datum in that register, position or the like in the second version of the set. Any difference in the data pairs will be determined as a change.

More sophisticated comparisons of the datasets can also be performed—subset pairs within the sets can be compared, for example. The data being compared may be able to be compared at different levels—the code itself, or the numerical data, or data objects, or schemes or the like may be compared. For example, a list of users for the two versions can be compared, with any additions immediately clear from the length of the list, from additional characters in the list, from data size of the list, or the like. A status indicator of the database could be the data/datum to be monitored, in which case a comparison only of a pair of single digits may be required. Fundamentally however, the comparison itself can be simple, by any previously considered means, because the underlying technique is a comparison of two datasets.

This comparison of the entire dataset with a previous version also allows far more detailed interrogation of the data than previous systems have been permitted. Since all data is available, and all data compared, even the smallest change will be detected in the comparison. In previous systems, change detection was only permitted at certain levels of the system, or had to rely on indicators at those higher levels of a change actually located inside a data object.

The change determined is then recorded 510, and only the determined change itself. For example, if a new version of a data object contains new data, the new parts of the data are stripped out and recorded; thus the whole dataset need not be stored, merely the differences from the previous version. For instance, a data object may contain additional information in an additional column added in the latest version; only this additional column is stored.

Additionally, the first time point data contents can then be discarded 514. This allows for a history of the changes to the database to be stored; it would likely be prohibitive to store each copy of the entire contents of the dataset. By storing only the changes identified, and the latest version of the dataset ready for comparison with the next version obtained, the storage needed can be greatly reduced, sufficiently for the record of each determined change to be maintained. This is in further contrast to previous systems, which monitored merely by finding changes and alerting to them, rather than recording their history specifically. For example, previous systems having identified that a system is not working, would not have the data available in a history to be able to identify that the system was malfunctioning in the same way three days ago. This may be of use in determining a course of action for rectification, or for prevention of this malfunction in the future.

In a further step, the change itself, i.e. the difference between the first and second time point data which has been recorded 510, is compared to a previous such determined change 512. For example, if a data object has been changed twice, a comparison of first/second time point data at the second time point will have picked up the first change (e.g. add a column), and a comparison of second/third time point data at the third time point will have picked up the second change (e.g. add a further column). A previous iteration (at 502a-510a) of the steps outlined above will have provided the previous determined and recorded change.

Such comparison can allow different types of monitoring analysis to be performed, such as tracking the progress of changes to a server/database, or monitoring the frequency of changes. This can allow the monitoring system to become more familiar with the database and its changes as the monitoring progresses, and can allow prioritising and categorisation of changes.

In an embodiment, combining the current full duplicated dataset and the previously stored detected changes, can be used to create a timeline report showing all changes of the environment from the current point in time to the first day of monitoring.

A specific embodiment of the disclosure can be described as follows, in relation to a database (server) system. The system works by querying database views for all objects and inserts the data into a centralized repository for comparison.
1. A package queries the database object views on each client database and inserts them into the repository via a DB link.
2. The repository contains tables which will hold the data in batch format from the Client DBs:
   i. The first run will contain all the schema objects as batch ID 1;
   ii. The second run will hold all the schema objects as batch ID 2.
3. There is a comparison package in the repository which will query the tables:
   i. The comparison looks for differences between the last batch of inserted data and the second to last batch.
4. Any differences in the schemas between the two batches will be written to a report and emailed;
   i. the system will use scheduling and alerting facilities in order run the reports.

The differences can also be stored, and batch ID 1 can be deleted, though batch ID 2 will usually be maintained for comparison with the next scan run.

In embodiments, the hub monitoring system can be a centralised repository for all monitored environments within an organisation. All data is kept in the central hub and can be used, for example, for company-wide reporting. For instance, a report can be run to show the percentage of all environments in the company that adhere to company standards.

Embodiments of the disclosure can use features such as those described above to provide a suite of tools, each with their own specific role in monitoring specific areas of a database infrastructure. Examples are:
Schema—monitoring any changes to objects (tables, indexes, etc.) in a schema and alerting the relevant user, device, system, or networked device when changes occur.
Capacity—tracking database growth and displaying growth patterns in a graphical format.
Scan—showing differences between multiple databases, including DB configuration settings, sizes, parameters, and the like. Useful for comparing different environments of one DB (test vs. production).
Audit—monitoring database user access that does not adhere to audit standards (e.g., alert on developers who wrongfully have admin privileges).
Data—monitoring tool that ensures replicated databases are in sync and will alert when there are differences in data between replicated DBs.
Server—alerting on changes to OS level of a database server. Changes in memory parameters, configuration, software, directories, permissions.
Infra—reporting on all software currently installed on a server.
Backups—checking and reporting on database backups. For example, data recording how long backups take can be compared with more recent data for this, to determine any spikes or lulls in backup duration.
Replication—checking replication procedures.
Standard—checking that all DBs are in the appropriate directory, and that servers are on the appropriate port, for example.

For example, Audit is a monitoring tool that checks the DB user permissions which have been added or deleted from day to day. This program also checks changes in the status of a request from implemented, pending or emergency implementation.

Audit operates on the client to hub model of the monitoring system, in which an identity checking application takes the form of the client. Requests for access are made through the identity checking application and are sent from the client to the hub, as part of the regular duplicate data, transfer to hub procedures as described above with basic embodiments of the disclosure. At the hub, procedures are run against the data. Finally results are sent via email from the hub to a destination, for example an administrator checking access permissions.

The procedures run on the hub compare current data against previous scans, and isolate new data. Any new data i.e.: new requests, are stored in a scan results table. These new requests are the details reported by email to the relevant party.

For example, Audit can check for any accesses of the database that do not have records in an identity check application (by detecting the changes in the access record between versions of the dataset), or prompt an alert on any access which has no request whatsoever.

In an embodiment, the audit reports can be filtered after the initial step of comparing the data with previous data to find differences. For example, a filter can remove access requests for employees that have DBA roles. These requests will be noted and added to the results table but will not be sent through the email system. This ensures only employees that are not entitled to access will have their request flagged.

As with other embodiments above, where data is no longer needed after compare procedures have been run, this can be removed to conserve space. The initial scan may need to be retained permanently; the current and previous scan are needed to run procedures but will be removed as needed.

Another example is the Schema tool, the purpose of which is to monitor any changes to a single database from day to day.

The following objects are monitored:
Tables
   New or deleted tables
   Table column definitions
Indexes
   Status
   Uniqueness
   Indexed Columns
Procedures
   New or deleted
Constraints
   New or deleted
   Constraint Type
   Constraint Columns Triggers
    New or deleted
    Status
Views
Table Partitions
Index Partitions The monitoring system of embodiments of the disclosure can also provide an overview of all monitoring tools, for example a dashboard application reflecting the results of the tasks the tools implement. This will contain the specified information from the particular scans that are needed for monitoring.

The dashboard itself will dynamically display key information in a variety of pages, depending on which scan tools are being/will be utilised.

It will be appreciated by those skilled in the art that the disclosure has been described by way of example only, and that a variety of alternative approaches may be adopted without departing from the scope of the disclosure, as defined by the appended claims.

With that said, and as described, it should be appreciated that one or more aspects of the present disclosure transform a general-purpose computing device into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of monitoring changes for a server system, the method comprising:
    duplicating all data contents of a dataset of a server system for a first time point of the dataset, wherein the server system is operated on a first hardware system;
    transferring the duplicated data contents, for the first time point, from the server system of the first hardware system to a monitoring system, wherein the monitoring system is operated on a second hardware system separate from the first hardware system;
    receiving, by a processor of the monitoring system, the duplicated data contents for the first time point;
    storing, by the processor of the monitoring system, the duplicated data contents for the first time point;
    duplicating all data contents of the dataset of the server system for a second time point of the dataset;
    transferring the duplicated data contents, for the second time point, from the server system of the first hardware system to the monitoring system;
    receiving, by the processor of the monitoring system, the duplicated data contents for the second time point;
    processing, by the processor of the monitoring system, the duplicated data contents on the second hardware system by:
        comparing, at the processor of the monitoring system, the duplicated data contents for the first time point of the dataset with the duplicated data contents for the second time point of the dataset;
        determining, based on the comparison, a change for the server system between the first and second time points; and
        storing, by the processor of the monitoring system, a record of the determined change; and
    after storing the record of the determined change, discarding, by the processor of the monitoring system, the stored duplicated data contents for the first time point of the dataset.

2. The method according to claim 1, further comprising:
    storing, by the processor of the monitoring system, the duplicated data contents for the second time point of the dataset;
    duplicating all data contents of the dataset of the server system for a third time point of the dataset;
    transferring the duplicated data contents, for the third time point, from the server system of the first hardware system to the monitoring system;
    receiving, by the processor of the monitoring system, the duplicated data contents for the third time point;

comparing, at the processor of the monitoring system, the duplicated data contents for the second time point of the dataset with the duplicated data contents for the third time point of the dataset;

determining, based on the comparison, a change for the server system between the second and third time points;

storing, by the processor of the monitoring system, a record of the determined change for the server system between the second and third time points; and after storing the record of the determined change for the server system between the second and third time points, discarding, by the processor of the monitoring system, the stored duplicated data contents for the second time point of the dataset.

3. The method according to claim 1, wherein comparing includes determining a difference between the duplicated data contents for the first time point of the dataset and the duplicated data contents for the second time point of the dataset; and wherein determining the change for the server system between the first and second time points includes noting the determined difference between the duplicated data contents for the first time point of the dataset and the duplicated data contents for the second time point of the dataset as the change for the server system.

4. The method according to claim 1, further comprising, after determining the change for the server system between the first and second time points, generating, by the processor of the monitoring system, an alert reporting said change.

5. The method according to claim 1, further comprising:

comparing, at the processor of the monitoring system, one or more parameters for the determined change to a stored record of one or more parameters of a previously determined change for the server system; and determining, by the processor of the monitoring system, one or more differences between the determined change and the previously determined change based on the comparison of the one or more parameters of said determined change and the one or more parameters of the previously determined change.

6. The method according to claim 1, wherein the server system is a database system including a database and a database management system.

7. The method according to claim 1, wherein the data contents include data relating to one or more of: data objects; schema; size; status; access history; synchronization; replication; operating system; and/or management parameters of a database of the server system.

8. A system for monitoring changes for a server system, the system comprising:

a first hardware system configured to operate the server system; wherein the server system includes a dataset; and wherein the first hardware system is configured to duplicate all data contents of the dataset of the server system, at each of a first time point and a second time point after the first time point;

a second hardware system separate from the first hardware system, the second hardware system including at least one processor; and a transmission device configured to transfer the duplicated data contents, for each of the first and second time points, from the server system of the first hardware system to the second hardware system;

wherein the at least one processor of the second hardware system is configured to:

receive the duplicated data contents for the first time point of the dataset and the duplicated data contents for the second time point of the dataset;

store the duplicated data contents for the first time point of the dataset and the duplicated data contents for the second time point of the dataset;

compare the duplicated data contents for the first time point of the dataset with the duplicated data contents for the second time point of the dataset;

determine, based on the comparison, a change for the server system between the first and second time points; and store a record of the determined change and discard the stored duplicated data contents for the first time point of the dataset.

* * * * *